(12) United States Patent
Lee et al.

(10) Patent No.: US 8,760,006 B2
(45) Date of Patent: Jun. 24, 2014

(54) WIRELESS POWER TRANSMISSION/RECEPTION APPARATUS AND METHOD HAVING COMMUNICATION FUNCTION

(75) Inventors: Kwang Du Lee, Jeollanam-do (KR); Kyung Uk Kim, Seoul (KR); Jeong Hoon Kim, Seoul (KR); Eung Ju Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 985 days.

(21) Appl. No.: 12/630,512

(22) Filed: Dec. 3, 2009

(65) Prior Publication Data
US 2011/0081857 A1    Apr. 7, 2011

(30) Foreign Application Priority Data

Oct. 7, 2009    (KR) ........................ 10-2009-0095289

(51) Int. Cl.
*H04B 5/00*    (2006.01)
*H04B 1/38*    (2006.01)
*H01F 38/00*    (2006.01)

(52) U.S. Cl.
USPC ......................................................... 307/104

(58) Field of Classification Search
USPC .............. 307/104; 455/90.2, 41.1, 571, 127.1
See application file for complete search history.

(56) References Cited

U.S. PATENT DOCUMENTS

| | | | | |
|---|---|---|---|---|
| 7,164,344 B2 * | 1/2007 | Deguchi et al. | ............ | 340/10.51 |
| 7,443,135 B2 * | 10/2008 | Cho | ............... | 320/108 |
| 7,522,878 B2 * | 4/2009 | Baarman | ...................... | 455/41.1 |
| 7,633,460 B2 * | 12/2009 | Camp et al. | ................... | 343/895 |
| 8,116,681 B2 * | 2/2012 | Baarman | ...................... | 455/41.1 |
| 8,223,014 B2 * | 7/2012 | Amir | .......................... | 340/539.3 |
| 2004/0134985 A1 | 7/2004 | Deguchi et al. | | |
| 2007/0075873 A1 * | 4/2007 | Yang et al. | ............... | 340/825.49 |
| 2008/0143536 A1 | 6/2008 | Camp et al. | | |
| 2009/0015075 A1 * | 1/2009 | Cook et al. | ..................... | 307/149 |
| 2011/0018494 A1 * | 1/2011 | Mita | ............................. | 320/108 |
| 2011/0080051 A1 | 4/2011 | Lee et al. | | |

FOREIGN PATENT DOCUMENTS

KR    1020090056546 A    6/2009

OTHER PUBLICATIONS

The Notice of Allowance in U.S. Appl. No. 12/630,348, mailed Sep. 19, 2013, 16 pages.
Response to Final Office Action filed Aug. 7, 2013 in U.S. Appl. No. 12/630,348, 15 pages.

* cited by examiner

*Primary Examiner* — Rexford Barnie
*Assistant Examiner* — Daniel Kessie
(74) *Attorney, Agent, or Firm* — McDermott Will & Emery LLP

(57) ABSTRACT

Disclosed herein is a wireless power transmission/reception apparatus and method having a communication function. The wireless power transmission/reception apparatus includes a wireless power transmission device and wireless power transmission devices. The wireless power transmission device receives a returned wireless power signal, detects the number of power consumption devices, modulates pieces of ID data, each including ID of a corresponding power consumption device, transmits the modulated ID data, receives returned ID data, and determines suitableness of the power consumption devices. Each of the wireless power reception devices returns a remaining wireless power signal which is not received among wireless power signals from the wireless power transmission device, and temporarily stops a power consumption device when an ID of the received ID data is an ID of a power consumption device connected thereto, thus returning ID data which will be subsequently received to the wireless power transmission device.

25 Claims, 9 Drawing Sheets

WIRELESS POWER TRANSMISSION/RECEPTION APPARATUS AND METHOD HAVING COMMUNICATION FUNCTION

CROSS REFERENCE TO RELATED APPLICATION

This application claims the benefit of Korean Patent Application No. 10-2009-0095289, filed on Oct. 7, 2009, entitled "The Wireless Power Transmission Apparatus Having Communication Function and Method Thereof", which is hereby incorporated by reference in its entirety into this application.

BACKGROUND OF THE INVENTION

1. Technical Field

The present invention relates generally to a wireless power transmission/reception apparatus and method having a communication function.

2. Description of the Related Art

With the development of wireless communication technology, ubiquitous information environments enabling anyone to exchange desired information anytime and anywhere have been implemented. However, most communication information devices still depend on batteries and are supplied with power by a wired power cord, and thus the use of communication information devices is limited. Therefore, the environment of a wireless information network cannot be actually freed from this limitation until the problem of terminal power is solved.

In order to solve this problem, various types of technologies for transmitting power in a wireless manner have been developed.

First, representative technologies may include radio reception technology using microwaves, magnetic induction technology using magnetic fields, and magnetic resonance technology using the energy conversion of magnetic fields and electric fields.

Radio reception technology is advantageous because microwaves are radiated into the air through an antenna, and thus long-distance power transmission is made possible. However, radio reception technology has high radiation loss due to the consumption of power by the air, and thus the efficiency of power transmission is limited.

Further, magnetic induction technology is a technology based on the coupling of magnetic energy using the primary coil of a transmitting end and the secondary coil of a receiving end, and is advantageous in that the efficiency of power transmission is high. However, magnetic induction technology is disadvantageous in that the primary coil of the transmitting end and the secondary coil of the receiving end must be located adjacent to each other within a short distance of about several mm so as to transmit power, in that the efficiency of power transmission rapidly changes according to the alignment of the primary coil of the transmitting end and the secondary coil of the receiving end, and in that the amount of heat generated is large.

Therefore, magnetic resonance technology that is similar to magnetic induction technology has recently been developed, but it is configured to concentrate energy on a specific resonant frequency determined by a coil inductor L and a capacitor C, and thus to transmit power in the form of magnetic energy. This is advantageous because a relatively large amount of power can be transmitted even a distance of several meters, but requires high resonance characteristics (high quality factor).

That is, magnetic induction technology is disadvantageous because the efficiency of power transmission rapidly changes depending on whether impedance matching has been realized or whether the resonant frequencies of the LC circuit of the transmitting end and the LC circuit of the receiving end are identical to each other.

Conventional magnetic induction technology deals with the above problems via communication between the transmitting end and the receiving end by mounting transceivers both on the transmitting end and on the receiving end. However, when the transceivers are separately mounted, problems arise in that costs required for a wireless power transmission device and a wireless power reception device increase, and the construction of the apparatuses is complicated.

SUMMARY OF THE INVENTION

Accordingly, the present invention has been made keeping in mind the above problems occurring in the prior art, and the present invention is intended to provide a wireless power transmission/reception apparatus and method having a communication function, which can perform both the transmission/reception of data and the transmission of wireless power using only a wireless power transmission device and wireless power reception devices, without requiring separate transceiver modules for communication between a transmitting end and a receiving end.

In accordance with an aspect of the present invention, there is provided a wireless power transmission/reception apparatus having a communication function, comprising a wireless power transmission device for receiving externally input power, generating a wireless power signal to be transmitted in a wireless manner, transmitting the wireless power signal in a wireless manner using a magnetic resonance method, receiving a returned wireless power signal, detecting a number of power consumption devices, transmitting the wireless power signal in a wireless manner using a resonant frequency corresponding to the detected number of power consumption devices, modulating pieces of identification (ID) data, each including an ID of a corresponding power consumption device, by using the wireless power signal as a carrier, transmitting the modulated ID data, receiving returned ID data, determining suitableness of the power consumption device, and transmitting the wireless power signal to the power consumption device; and a plurality of wireless power reception devices for receiving the wireless power signal transmitted from the wireless power transmission device using a magnetic resonance method, providing the wireless power signal to a power consumption device connected thereto, returning a remaining wireless power signal that has not been received, receiving ID data from the wireless power transmission device, and temporarily stopping the connected power consumption device and returning ID data, which will be subsequently received, to the wireless power transmission device when each ID included in the received ID data is an ID of the connected power consumption device.

In an embodiment, the wireless power transmission device comprises a power signal generation unit for receiving the externally input power and generating and outputting the wireless power signal; an On/Off Keying (OOK) modulator for transferring the wireless power signal output from the power signal generation unit, receiving the ID data including the ID of the power consumption device, OOK modulating the ID data by using the wireless power signal output from the power signal generation unit as the carrier, and outputting the modulated ID data; a transmission antenna unit configured to include an inductor and a capacitor and to transmit both the wireless power signal and the modulated ID data using the resonant frequency determined by the inductor and the capacitor through the magnetic resonance method, and to receive and output the returned wireless power signal and the returned ID data which are received from the wireless power reception devices; a directional power coupling unit for outputting the wireless power signal, input through a first port, to the transmission antenna unit through a second port, outputting the modulated ID data, input through the first port, to the transmission antenna unit through the second port, and outputting the returned wireless power signal and the returned ID data, input from the transmission antenna unit through the second port, through a third port; an envelope/power detection unit for detecting and outputting a power intensity of the returned wireless power signal output through the third port, and detecting and outputting an envelope of the returned ID data; and a control unit for detecting a number of power consumption devices corresponding to the power intensity of the returned wireless power signal detected by the envelope/power detection unit, controlling the transmission antenna unit so that the wireless power signal is transmitted using the resonant frequency corresponding to the detected number of power consumption devices, providing the ID data including the ID of a corresponding power consumption device to the OOK modulator, controlling the OOK modulator such that the ID data including the ID of the power consumption device is OOK modulated by using the wireless power signal as the carrier and the modulated ID data is transmitted, detecting the returned ID data using the envelope detected by the envelope/power detection unit, determining suitableness of the power consumption device based on the detected returned ID data, and controlling the transmission antenna unit so that power is provided to the power consumption device.

In an embodiment, the wireless power transmission device further comprises an impedance matching unit disposed between the power signal generation unit and the transmission antenna unit and configured to perform impedance matching between the power signal generation unit and the transmission antenna unit.

In an embodiment, the control unit finds a minimum inflection point of the returned wireless power signal received from the envelope/power detection unit while varying impedance of the impedance matching unit, and sets the impedance of the impedance matching unit to impedance corresponding to the detected minimum inflection point.

In an embodiment, the control unit finds a minimum inflection point of the returned wireless power signal received from the envelope/power detection unit and sets the resonant frequency of the transmission antenna unit to a resonant frequency corresponding to the detected minimum inflection point.

In an embodiment, the power signal generation unit comprises a signal oscillation unit for receiving the external power and generating the wireless power signal desired to be transmitted; and a power amplification unit for amplifying and outputting the wireless power signal generated by the signal oscillation unit.

In an embodiment, each of the wireless power reception devices comprises a reception antenna unit configured to include an inductor and a capacitor and to receive the signal and the data transmitted from the wireless power transmission device, that is, both the wireless power signal and the ID data, modulated by using the wireless power signal as the carrier, using a resonant frequency determined by the inductor and the capacitor through the magnetic resonance method, and to return the remaining wireless power signal and the modulated ID data to the wireless power transmission device; a power signal conversion unit connected to a corresponding power consumption device and configured to convert the wireless power signal received by the reception antenna unit into a power signal based on a power supply method, and provide the power signal to the power consumption device; an envelope/power detection unit for detecting a power intensity of the wireless power signal received by the reception antenna unit, outputting the power intensity, detecting an envelope from the ID data received by the reception antenna unit, and outputting the envelope; and a control unit for performing control such that the reception antenna unit receives both the wireless power signal and the ID data, extracting the ID data using the envelope detected by the envelope/power detection unit, and performing control such that, when an ID included in the extracted ID data is an ID of the power consumption device, the corresponding power consumption device is temporarily stopped and ID data, which will be subsequently received, is returned to the wireless power transmission device.

In an embodiment, the control unit finds a maximum inflection point of the power intensity detected by the envelope/power detection unit while tuning the resonant frequency of the reception antenna unit, and sets the resonant frequency of the reception antenna unit to a resonant frequency corresponding to the detected maximum inflection point.

In an embodiment, the wireless power reception device further comprises an impedance matching unit disposed between the reception antenna unit and the power signal conversion unit; and the control unit finds a maximum inflection point of the power intensity detected by the envelope/power detection unit while tuning impedance of the impedance matching unit, and sets the impedance of the impedance matching unit to impedance corresponding to the detected maximum inflection point.

In an embodiment, the wireless power reception device further comprises a switch unit disposed between the reception antenna unit and the power signal conversion unit and configured to interrupt transmission of power received by the reception antenna unit; and the control unit interrupts transmission of the power, received by the reception antenna unit, by controlling the switch unit when connection of the power consumption device is released.

In accordance with another aspect of the present invention, there is provided a wireless power transmission device having a communication function, comprising a power signal generation unit for receiving externally input power and generating and outputting a wireless power signal; an On/Off Keying (OOK) modulator for transferring the wireless power signal output from the power signal generation unit, receiving pieces of identification (ID) data, each including an ID of a corresponding power consumption device, OOK modulating the ID data by using the wireless power signal as a carrier, and outputting the modulated ID data; a transmission antenna unit configured to include an inductor and a capacitor and to transmit both the wireless power signal and the modulated ID data using a resonant frequency determined by an inductor and a capacitor through a magnetic resonance method, and to receive and output a returned wireless power signal and returned ID data which are received from wireless power reception devices; a directional power coupling unit for outputting the wireless power signal, input through a first port, to the transmission antenna unit through a second port, outputting the modulated ID data, input through the first port, to the transmission antenna unit through the second port, and outputting the returned wireless power signal and the returned ID data, input from the transmission antenna unit through the second port, through a third port; an envelope/power detection unit for detecting and outputting a power intensity of the returned wireless power signal output through the third port, and detecting and outputting an envelope of the returned ID data; and a control unit for detecting a number of power consumption devices corresponding to the power intensity of the returned wireless power signal detected by the envelope/power detection unit, controlling the transmission antenna unit so that the wireless power signal is transmitted using the resonant frequency corresponding to the detected number of power consumption devices, providing the ID data including the ID of a corresponding power consumption device to the OOK modulator, controlling the OOK modulator such that the ID data including the ID of the power consumption device is OOK modulated by using the wireless power signal as the carrier and the modulated ID data is transmitted, detecting the returned ID data using the envelope detected by the envelope/power detection unit, determining suitableness of the power consumption device based on the detected returned ID data, and controlling the transmission antenna unit so that power is provided to the power consumption device.

In an embodiment, the wireless power transmission device further comprises an impedance matching unit disposed between the power signal generation unit and the transmission antenna unit and configured to perform impedance matching between the power signal generation unit and the transmission antenna unit.

In an embodiment, the control unit finds a minimum inflection point of the returned wireless power signal received from the envelope/power detection unit while varying impedance of the impedance matching unit, and sets the impedance of the impedance matching unit to impedance corresponding to the detected minimum inflection point.

In an embodiment, the control unit finds a minimum inflection point of the returned wireless power signal received from the envelope/power detection unit and sets the resonant frequency of the transmission antenna unit to a resonant frequency corresponding to the detected minimum inflection point.

In accordance with a further aspect of the present invention, there is provided a wireless power reception device having a communication function, comprising a reception antenna unit configured to include an inductor and a capacitor and to receive a signal and data transmitted from a wireless power transmission device, that is, both a wireless power signal and identification (ID) data, modulated by using the wireless power signal as a carrier, using a resonant frequency determined by the inductor and the capacitor through a magnetic resonance method, and to return a remaining wireless power signal and the modulated ID data to the wireless power transmission device; a power signal conversion unit connected to a corresponding power consumption device and configured to convert the wireless power signal received by the reception antenna unit into a power signal based on a power supply method, and provide the power signal to the power consumption device; an envelope/power detection unit for detecting a power intensity of the wireless power signal received by the reception antenna unit, outputting the power intensity, detecting an envelope from the ID data received by the reception antenna unit, and outputting the envelope; and a control unit for performing control such that the reception antenna unit receives both the wireless power signal and the ID data, extracting the ID data using the envelope detected by the envelope/power detection unit, and performing control such that, when an ID included in the extracted ID data is an ID of the power consumption device, the corresponding power consumption device is temporarily stopped and ID data, which will be subsequently received, is returned to the wireless power transmission device.

In an embodiment, the control unit finds a maximum inflection point of the power intensity detected by the envelope/power detection unit while tuning the resonant frequency of the reception antenna unit, and sets the resonant frequency of the reception antenna unit to a resonant frequency corresponding to the detected maximum inflection point.

In an embodiment, the wireless power reception device further comprises an impedance matching unit disposed between the reception antenna unit and the power signal conversion unit, wherein the control unit finds a maximum inflection point of the power intensity detected by the envelope/power detection unit while tuning impedance of the impedance matching unit, and sets the impedance of the impedance matching unit to impedance corresponding to the detected maximum inflection point.

In an embodiment, wireless power reception device further comprises a switch unit disposed between the reception antenna unit and the power signal conversion unit and configured to interrupt transmission of power received by the reception antenna unit, wherein the control unit interrupts transmission of the power, received by the reception antenna unit, by controlling the switch unit when connection of the power consumption device is released.

In an embodiment, the envelope/power detection unit comprises an envelope detection unit and a power detection unit; the wireless power reception device further comprises a power coupling unit disposed between the reception antenna unit and the power signal conversion unit; and the wireless power signal is output both to the envelope detection unit and to the power detection unit.

In accordance with yet another aspect of the present invention, there is provided a wireless power transmission/reception method having a communication function, comprising (A) a wireless power transmission device transmitting a wireless power signal to a plurality of wireless power reception devices using a magnetic resonance method, receiving a remaining wireless power signal which is returned among wireless power signals provided to power consumption devices respectively connected to the wireless power reception devices, from the wireless power reception devices, and determining whether the power consumption devices are connected; (B) if it is determined that the power consumption devices are connected, the wireless power transmission device finding a resonant frequency enabling transmission of maximum power, detecting a number of power consumption devices, and transmitting the wireless power signal at a power intensity corresponding to the detected number of power consumption devices; (C) the wireless power transmission device modulating pieces of identification (ID) data, each including an ID assigned to a corresponding power consumption device, by using the wireless power signal as a carrier through On/Off keying (OOK) modulation, and sequentially and repeatedly transmitting the modulated ID data at least twice; (D) each of the plurality of wireless power reception devices receiving the ID data, detecting an ID from the ID data, and temporarily stopping a power consumption device connected thereto and returning ID data, which will subsequently reach the wireless power reception device, when the detected ID is an ID of the connected power consumption device; and (E) the wireless power transmission device receiving the returned ID data, determining that the connected power consumption device is suitable when the returned ID data is identical to the transmitted ID data, and then continuing to transmit power.

In an embodiment, (A) comprises (A-1) the wireless power transmission device transmitting the wireless power signal to the wireless power reception devices using the magnetic resonance method; (A-2) each of the wireless power reception devices receiving the wireless power signal to be provided to a power consumption device connected thereto, and returning the remaining wireless power signal; and (A-3) the wireless power transmission device receiving the returned wireless power signal, detecting a power intensity of the returned wireless power signal, and then determining whether the power consumption devices are connected.

In an embodiment, (B) comprises (B-1) if it is determined that the power consumption devices are connected, the wireless power transmission device finding a minimum inflection point of the returned wireless power signal while varying a resonant frequency; and (B-2) the wireless power transmission device determining that a resonant frequency corresponding to the found minimum inflection point is a resonant frequency enabling transmission of maximum power, detecting a number of power consumption devices using the determined resonant frequency, and transmitting the wireless power signal at a power intensity corresponding to the detected number of power consumption devices.

In accordance with still another aspect of the present invention, there is provided a wireless power transmission method having a communication function, comprising (A) a wireless power transmission device transmitting a wireless power signal to wireless power reception devices using a magnetic resonance method; (B) the wireless power transmission device receiving a returned wireless power signal which is received from the wireless power reception devices, detecting a power intensity of the returned wireless power signal, and determining whether the power consumption devices are connected; (C) if it is determined that the power consumption devices are connected, the wireless power transmission device finding a resonant frequency enabling transmission of maximum power, detecting a number of power consumption devices, and transmitting the wireless power signal at the power intensity corresponding to the detected number of power consumption devices; (D) the wireless power transmission device modulating pieces of identification (ID) data, each including an ID assigned to a corresponding power consumption device, using the wireless power signal as a carrier through On/Off Keying (OOK) modulation, and sequentially and repeatedly transmitting the modulated ID data at least twice; and (E) the wireless power transmission device receiving returned ID data from the wireless power reception devices, determining that the connected power consumption devices are suitable when the returned ID data is identical to the transmitted ID data, and continuing to transmit wireless power.

In an embodiment, (C) comprises (C-1) if it is determined that the power consumption devices are connected, the wireless power transmission device finding a minimum inflection point of the returned wireless power signal while varying the resonant frequency; and (C-2) the wireless power transmission device determining that the resonant frequency corresponding to the found minimum inflection point is a resonant frequency enabling transmission of maximum power, detecting the number of power consumption devices using the determined resonant frequency, and transmitting the wireless power signal at a power intensity corresponding to the detected number of power consumption devices.

In accordance with still another aspect of the present invention, there is provided a wireless power reception method having a communication function, comprising (A) when a wireless power signal is transmitted from a wireless power transmission device, wireless power reception devices receiving wireless power signals to be provided to power consumption devices connected thereto from the wireless power transmission device, and returning a remaining wireless power signal; (B) each of the wireless power reception devices receiving ID data transmitted from the wireless power transmission device, detecting an ID from the ID data, and temporarily stopping a power consumption device connected thereto and returning ID data, which will subsequently reach the wireless power reception device when the detected ID is an ID of the connected power consumption device; and (C) when connection of the power consumption device to the wireless power reception device is released, the wireless power reception device stopping reception of the wireless power signal transmitted from the wireless power transmission device.

DESCRIPTION OF THE PREFERRED EMBODIMENTS

Figure 1:
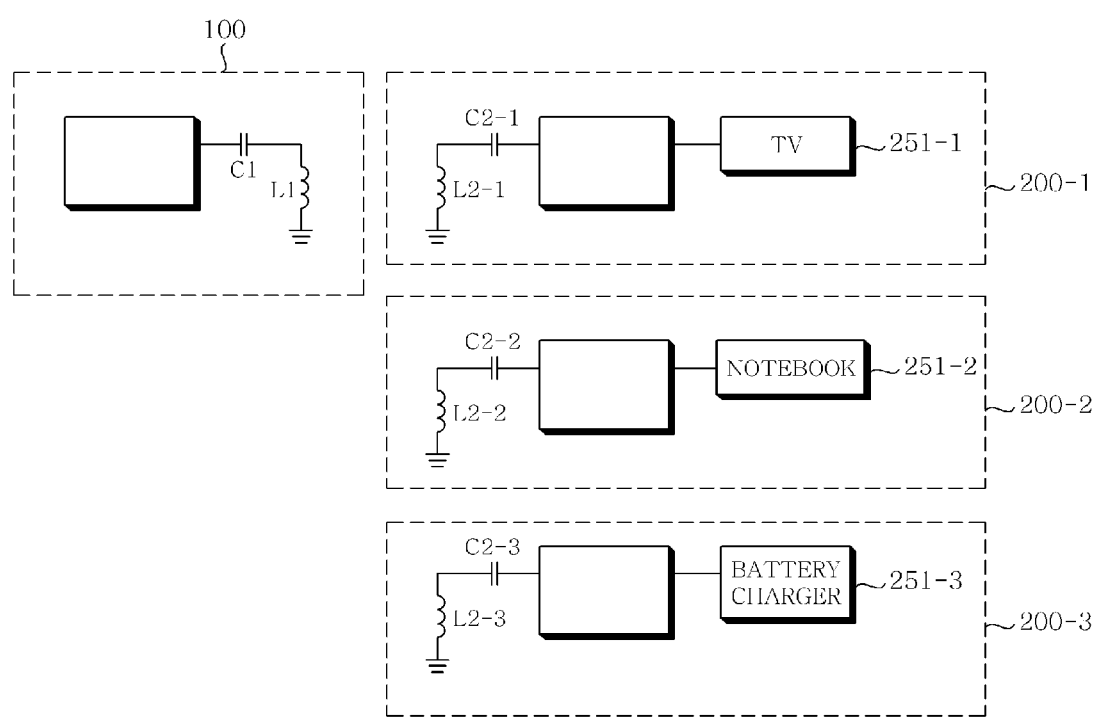
FIG. 1 is a block diagram schematically showing the construction of a wireless power transmission/reception apparatus according to an embodiment of the present invention.

The objects, features and advantages of the present invention will be more clearly understood from the following detailed description and preferred embodiments taken in conjunction with the accompanying drawings. In the present specification, reference now should be made to the drawings, in which the same reference numerals are used throughout the different drawings to designate the same or similar components. Further, in the description of the present invention, if detailed descriptions of related well-known constructions or functions are determined to make the gist of the present invention unclear, the detailed descriptions will be omitted.

Hereinafter, embodiments of the present invention will be described in detail with the attached drawings.

FIG. 1 is a block diagram schematically showing the construction of a wireless power transmission/reception apparatus according to an embodiment of the present invention.

Referring to FIG. 1, the wireless power transmission/reception apparatus includes a wireless power transmission device 100 and a plurality of wireless power reception devices 200 (200-1, 200-2, and 200-3).

Each of the wireless power reception devices 200-1, 200-2 and 200-3 includes a power consumption device 251, which may be a television 251-1, a notebook computer 251-2 or a battery charger 251-3.

The wireless power transmission device 100 includes a capacitor C1 and an inductor L1, and each of the wireless power reception devices 200-1, 200-2 and 200-3 includes a capacitor C2-1, C2-2 or C2-3 and an inductor L2-1, L2-2 or L2-3. Therefore, the wireless power transmission device 100 and the wireless power reception devices 200 transmit or receive power using a magnetic resonance method.

In this case, the wireless power transmission device 100 sets an initial resonant frequency, transmits a wireless power signal to the wireless power reception devices 200 using the initial resonant frequency, receives a returned wireless power signal that is received from the wireless power reception devices 200, and then detects the number of wireless power reception devices 200 which are in a reception state for the wireless power signal.

Further, the wireless power transmission device 100 transmits a wireless power signal using a resonant frequency suitable for the detected number of wireless power reception devices 200 which are in the reception state.

Meanwhile, a unique power consumption device identification (ID) is assigned to each of the power consumption devices 251 included in the respective wireless power reception devices 200.

Further, the wireless power reception devices 200 recognize the power consumption device IDs of the power consumption devices 251 included thereto.

Furthermore, the wireless power transmission device 100 recognizes the power consumption device IDs of the respective power consumption devices 251.

In this case, the wireless power transmission device 100 performs On-Off Keying (OOK) modulation by multiplying ID data, including a unique power consumption device ID, by a carrier (in this case, a wireless power signal) having a specific frequency band through the use of an OOK modulator provided therein, and repeatedly transmits a wireless power signal including the modulated ID data to the wireless power reception device 200, and thus determines whether the power consumption device 251 having the power consumption device ID is in a reception enable state for wireless power.

This operation is described in detail below. The wireless power transmission device 100 performs OOK modulation by multiplying ID data including the unique power consumption device ID by the carrier (in this case, a wireless power signal) having a specific frequency band, using the OOK modulator, and repeatedly transmits a wireless power signal including the modulated ID data to the wireless power reception devices 200.

Then, a wireless power reception device 200, which is in a wireless power reception state, receives the modulated ID data and checks the received power consumption device ID. When the checked power consumption device ID is the power consumption device ID of the power consumption device 251 connected to the power reception device 200, the wireless power reception device 200 turns off its own switch, thus returning a wireless power signal which include modulated ID data and will be subsequently received.

In this way, when the wireless power reception device 200 returns the wireless power signal including ID data, the wireless power transmission device 100 receives the returned wireless power signal and determines that the power consumption device 251 corresponding to the power consumption device ID, included in the ID data, is a suitable power consumption device 251 and is in a reception state.

The reason that the wireless power transmission device 100 determines the suitableness of the wireless power reception device 200 in a wireless power reception state is that the number of unsuitable external wireless power reception devices may be included in the number of wireless power reception devices in a reception state, which was detected when the wireless power transmission device 100 transmitted a wireless power signal to the wireless power reception devices 200 using the initial resonant frequency.

For example, in the case where one unsuitable wireless power reception device is present within a wireless power signal transmission range of the wireless power transmission device 100, when the number of wireless power reception devices in a reception state is detected using the initial resonant frequency set in the wireless power transmission device 100, one is added to the number of actual wireless power reception devices which are turned on among suitable wireless power reception devices. In this state, when he suitableness of the wireless power reception devices which have been determined by the wireless power transmission devices 100 to be in a reception state is determined, it can be seen that one unsuitable wireless power reception device is present within the transmission range of the wireless power signal. Accordingly, proper measures are taken, thus enabling the transmission of maximum power to be performed.

Figure 2:
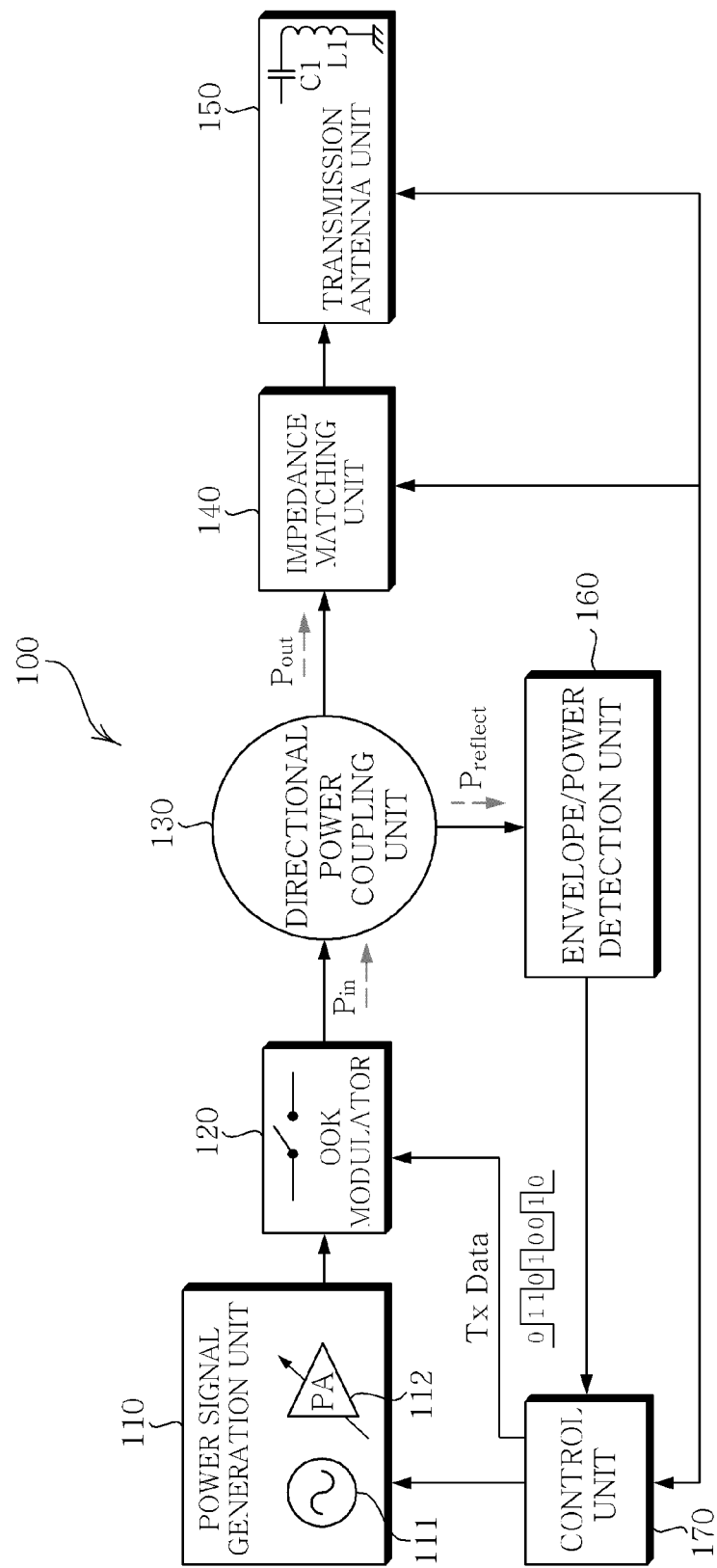
FIG. 2 is a block diagram schematically showing the construction of a wireless power transmission device according to an embodiment of the present invention.

FIG. 2 is a block diagram schematically showing the construction of the wireless power transmission device 100 according to an embodiment of the present invention. Hereinafter, the wireless power transmission device 100 according to the present embodiment will be described in detail.

As shown in FIG. 2, the wireless power transmission device 100 according to the present embodiment includes a power signal generation unit 110, an On/Off Keying (OOK) modulator 120, a directional power coupling unit 130, an impedance matching unit 140, a transmission antenna unit 150, an envelope/power detection unit 160, and a control unit 170.

In this case, the power signal generation unit 110 generates a wireless power signal to transmit external power in a wireless manner, and amplifies and outputs the generated wireless power signal.

The power signal generation unit 110 may be configured to include a signal oscillation unit 111. The signal oscillation unit 111 converts the external power into the wireless power signal. Since the wireless power signal is an Alternating Current (AC) signal, and an externally input AC signal may be of an AC signal unsuitable for the transmission of wireless power, the signal oscillation unit 111 converts the external power into an AC signal suitable for wireless transmission, and outputs the AC signal.

Further, the power signal generation unit 110 may include a power amplification unit 112, which amplifies and outputs the wireless power signal so as to improve the efficiency of wireless power transmission.

Further, the OOK modulator 120 performs OOK modulation by multiplying the ID data, including a power consumption device ID, transmission frequency information, transmission power intensity information, etc., which are input from the control unit 170 through the switching circuit, by a carrier having a specific frequency band (in this case, a wireless power signal).

Here, the ID data may have a value such as "11010, 11001" by the ON/OFF operation of the switching circuit. "1" is a value indicating the state in which the switching circuit is connected, and "0" is a value indicating the state in which the switching circuit is disconnected.

The switching circuit of the OOK modulator 120 repeats ON/OFF operations depending on the value of ID data when transmitting the ID data. In contrast, the switching unit is always maintained in its ON state when transmitting the wireless power signal which is not ID data. The ON/OFF operations of the switching circuit of the OOK modulator 120 are performed under the control of the control unit 170.

Next, the directional power coupling unit 130 includes a plurality of ports, and is configured to change the directionality of an input signal by enabling a signal, input through one port, to be output through only one of the remaining ports, and preventing the signal from being output through ports other than the output port.

When such a directional power coupling unit 130 is used, the ID data, which is modulated by using as the carrier the wireless power signal output from the power signal generation unit 110 (the wireless power signal is input via the OOK modulator 120), or the wireless power signal output from the OOK modulator 130, can be transmitted to the transmission antenna unit 150. According to the characteristics of magnetic coupling energy forming a closed loop, when the wireless power signal transmitted from the transmission antenna unit 150 and the modulated ID data are not received by the wireless power reception device, and are returned to the transmission antenna unit 150, the returned wireless power signal (hereinafter referred to as a 'returned wireless power signal') and the returned ID data (hereinafter referred to as 'returned ID data') (this data is returned with it loaded onto the returned wireless power signal) are received from the transmission antenna unit 150 and may be output to the envelope/power detection unit 160.

Consequently, the directional power coupling unit 130 includes a plurality of input/output ports, and transfers both an input wireless power signal and input ID data only to a port connected to the transmission antenna unit 150, and transfers both a returned wireless power signal and returned ID data only to a port connected to the envelope/power detection unit 160.

In this case, the directional power coupling unit 130 is implemented as a circulator having three ports. The circulator includes a plurality of ports, but transfers an input signal only in one direction regardless of the location of a port through which the signal is input.

Therefore, the circulator includes a first port connected to the OOK modulator 120, a second port connected to the transmission antenna unit 150, and a third port connected to the envelope/power detection unit 160. A wireless power signal and modulated ID data which are input through the first port are output through the second port. A returned wireless power signal and returned ID data which are input through the second port are output only through the third port.

Next, the impedance matching unit 140 corrects impedance matching between the transmission antenna unit 150 and the power amplification unit 112.

As described above, in order to increase or adjust the intensity of transmission power, the power amplification unit 112 is included in the power signal generation unit. In order to drive the power amplification unit 112, a load impedance of several tens of ohms is required, but the actual impedance of the first capacitor C1 and the first inductor L1 of the transmission antenna unit 150 is only several ohms to increase a resonance Q-factor. Since such impedance mismatching reduces the transmission efficiency of a wireless power signal, impedance correction is required for matching between the impedance of the transmission antenna unit 150 and the impedance of the power amplification unit 112.

Further, the transmission antenna unit 150 includes a first capacitor C1 and a first inductor L1, and transmits both the wireless power signal and modulated ID data to a reception antenna unit 210, which will be described later (refer to FIG. 3), using a magnetic resonance method.

Here, the term "magnetic resonance method" refers to a method of causing resonance by allowing the LC resonant frequency of the transmission antenna unit 150 to be identical to that of the reception antenna unit, thus maximizing energy coupling. Therefore, the resonant frequency of the transmission antenna unit 150 is determined by the capacitance of the first capacitor C1 and the inductance of the first inductor L1.

Further, the transmission antenna unit 150 receives a returned wireless power signal and returned ID data which are received in a wireless power transmission state. The Maxwell's fourth equation, related to electromagnetic waves, states that a magnetic force always forms a closed loop. Since the magnetic field circulates while forming a closed loop, the transmitted wireless power signal and modulated ID data, except for a wireless power signal and modulated ID data received by the reception antenna unit 210 (refer to FIG. 3), are returned to the transmission antenna unit 150. Therefore, when the reception antenna unit is not present (or when the reception antenna unit is not in a reception enable state for a wireless power signal), the transmission antenna unit 150 receives a returned wireless power signal having an intensity almost identical to that of a transmitted wireless power signal, and receives returned ID data almost identical to transmitted ID data.

Meanwhile, the envelope/power detection unit 160 detects the power intensity of the returned wireless power signal, input from the directional power coupling unit 130, detects the envelope of the returned ID data, and outputs the detected power intensity and envelope to the control unit 170.

Since the wireless power transmission device 100 according to the present invention determines the presence of the power consumption devices 251 included in the wireless power reception devices and identifies the power consumption devices 251 through simplex communication, the wireless power transmission device 100 must detect the returned wireless power signal and the returned ID data according to the Maxwell's fourth equation.

In this case, the envelope/power detection unit 160 outputs the detected power intensity of the returned wireless power signal and the detected envelope of the returned ID data to the control unit 170, which will be described later. Since the power intensity of the returned wireless power signal and the envelope of the returned ID data are analog signals, an Analog/Digital Converter (ADC) (not shown) may be further included to output digital signals to the control unit 170.

Further, the control unit 170 controls the entire operation of the wireless power transmission device 100.

The control unit 170 sets the initial resonant frequency, enables the wireless power signal to be transmitted to the wireless power reception devices through the transmission antenna unit 150 using the set initial resonant frequency, enables the returned wireless power signal from the wireless power reception devices to be received through the transmission antenna unit 150, and then detects the number of wireless power reception devices (in a wireless power reception state).

Further, the control unit 170 increases the power of the wireless power signal so that it has a power intensity corresponding to the detected number of wireless power reception devices), and enables the wireless power signal to be transmitted after the power has increased.

In this case, the control unit 170 adjusts the resonant frequency by controlling the transmission antenna unit 150 so that the transmission of maximum power occurs, and also adjusts the impedance of the impedance matching unit 140.

Further, the control unit 170 repeatedly and sequentially transmits pieces of ID data, each including an ID assigned to a corresponding power consumption device 251 and modulated by the OOK modulator 120, at least twice through the transmission antenna unit 150, and then determines whether the power consumption devices 251 included in the respective wireless power reception devices are suitable for power transmission.

If it is determined that the power consumption devices 251 to which power is desired to be transmitted are suitable, the control unit 170 adjusts the resonant frequency by controlling the transmission antenna unit 150 so that the transmission of maximum power occurs, and also adjusts the impedance of the impedance matching unit 140 so that the transmission of maximum power occurs.

Figure 5:
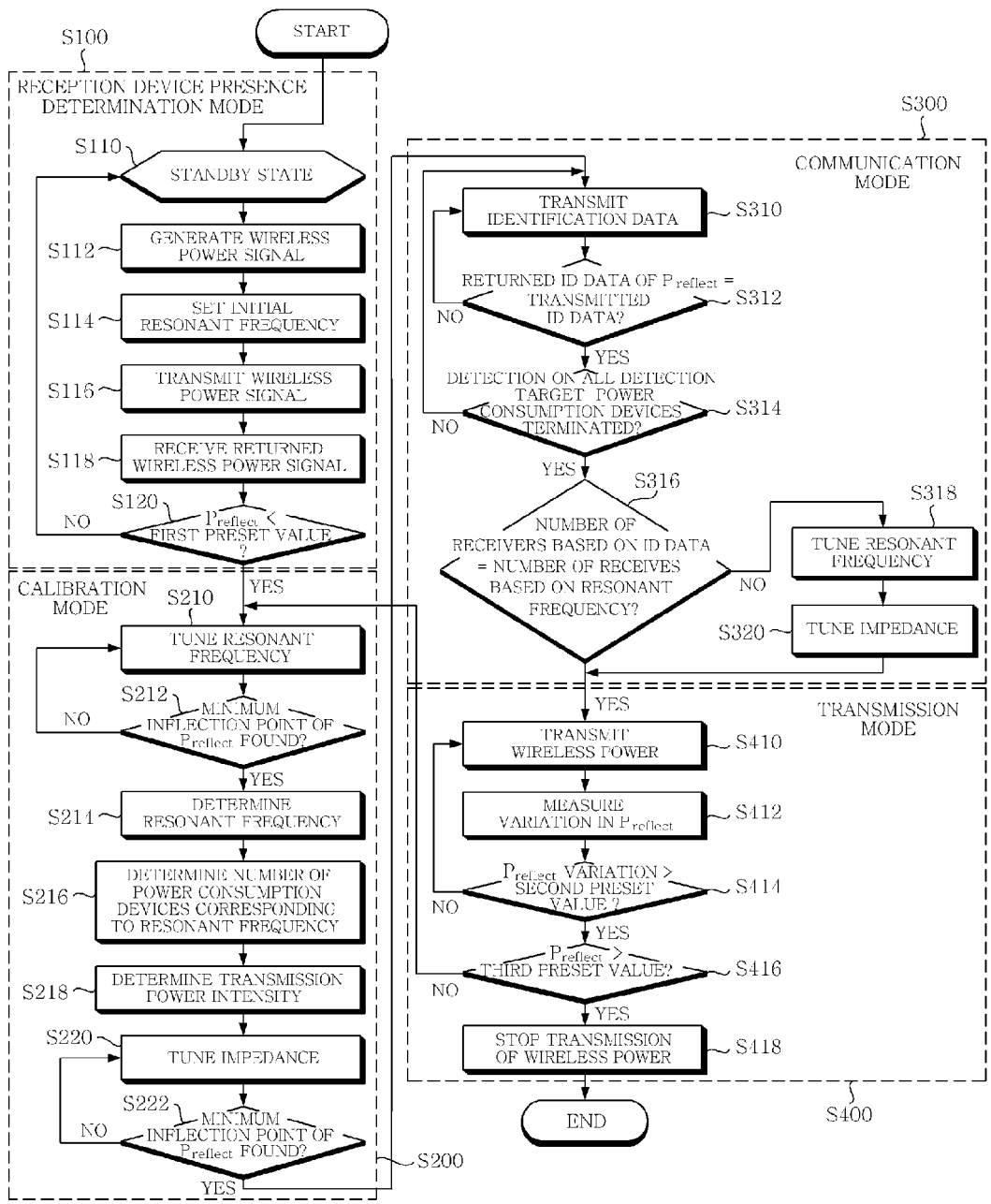
FIG. 5 is a flowchart showing a wireless power transmission method using a wireless power transmission device according to an embodiment of the present invention.

The operation of the wireless power transmission device having the above construction will be more clearly understood from the description of the flowchart of FIG. 5 showing the wireless power transmission method, which will be described later.

Figure 3:
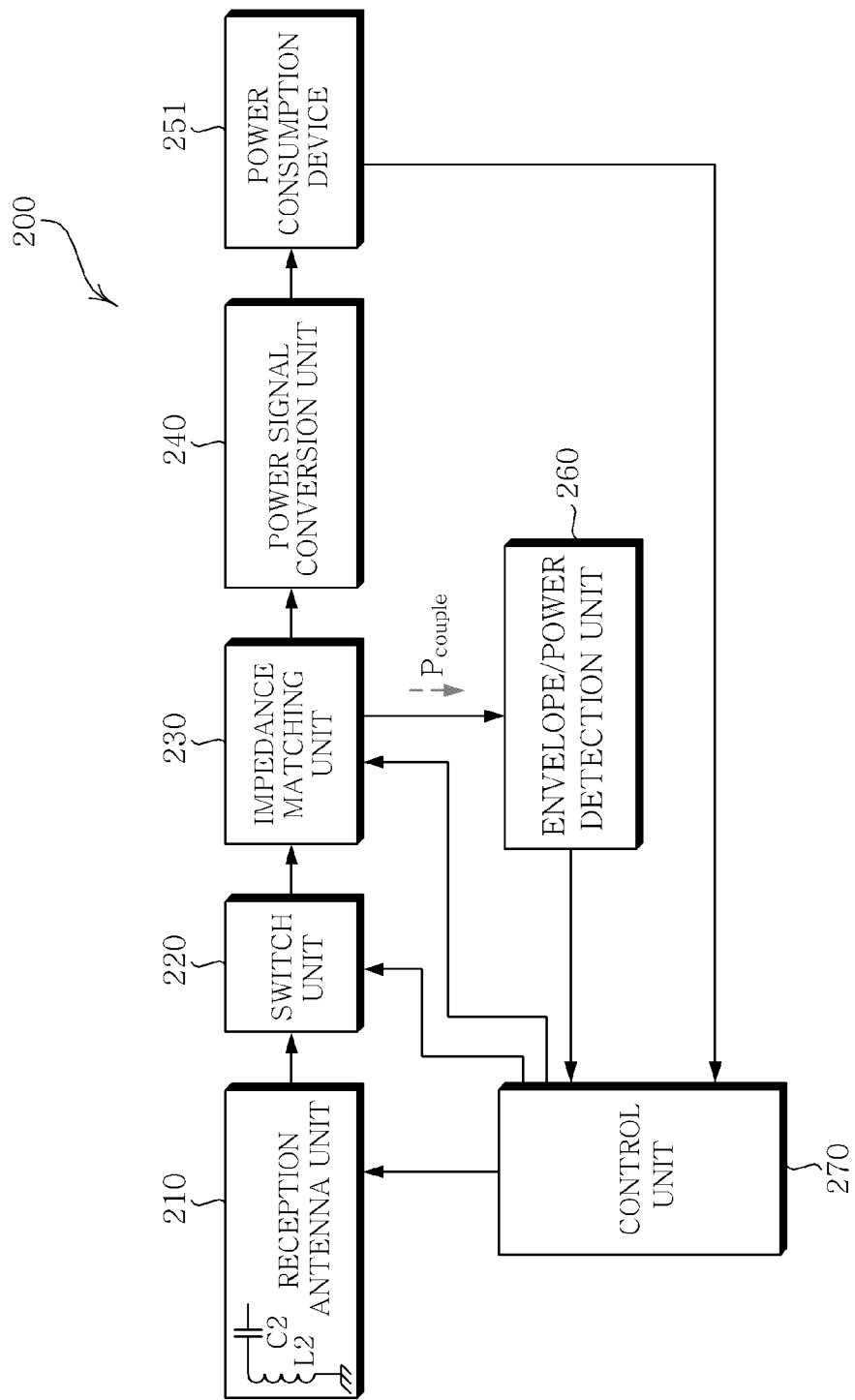
FIG. 3 is a block diagram schematically showing the construction of a wireless power reception device according to an embodiment of present invention.

FIG. 3 is a block diagram schematically showing the construction of the wireless power reception device 200 according to an embodiment of the present invention. Hereinafter, the wireless power reception device 200 according to the present embodiment will be described with reference to FIG. 3.

As shown in FIG. 3, the wireless power reception device 200 according to the present embodiment includes a reception antenna unit 210, a switch unit 220, an impedance matching unit 230, a power signal conversion unit 240, a power consumption device 251, an envelope/power detection unit 260, and a control unit 270.

In this case, the reception antenna unit 210 includes a second capacitor C2 and a second inductor L2, and receives both a wireless power signal and ID data, which is modulated using the wireless power signal as a carrier, from the above-described transmission antenna unit 150 (refer to FIG. 2) using a magnetic resonance method.

Further, the switch unit 220 determines the reception standby state or reception termination state of the wireless power reception device 200.

When the switch unit 220 is turned on, the wireless power reception device 200 receives a wireless power signal, whereas when the switch unit 220 is turned off, the wireless power reception device 200 stops receiving the wireless power signal.

For example, the switch unit 220 performs a switching operation such that, when the wireless power reception device 200 does not need power any more (for example, when the power consumption device 251 is turned off), magnetic coupling to the transmitting end is terminated, and such that, when the power consumption device 251 is turned on, magnetic coupling to the transmitting end is initiated.

Further, when the ID data modulated using the wireless power signal as a carrier is received, the switch unit 220 is turned on or off. For example, in the case where two wireless power signals each containing ID data are successively input, the switch unit 220 receives the ID data in an ON state. When the ID data is identical to the value input to the control unit 270, the switch unit 220 switches from the ON state to an OFF state, thus enabling the wireless power transmission device 100 to receive the returned ID data. In contrast, when the ID data is not identical to the input value, the switch unit 220 is maintained in its ON state, thus preventing the wireless power transmission device 100 from receiving returned ID data.

Furthermore, the power signal conversion unit 240 maintains the received wireless power signal at an AC level or converts the AC signal to a DC signal so as to charge the power consumption device 251 with appropriate power, or supply the power to the power consumption device 251.

Therefore, the power signal conversion unit 240 may include an AC-AC converter (not shown) for maintaining the received wireless power signal at an appropriate AC level, and an AC-DC converter (not shown) for converting the received wireless power signal into an appropriate DC signal.

Next, the power consumption device 251 receives and consumes the wireless power signal received through the reception antenna unit 210. The power consumption device 251 may be one of a television, a notebook computer, and a battery charger, as described above.

The power consumption device 251 is assigned a power consumption device ID enabling the power consumption device 251 to be identifiable. When the power consumption device 251 is connected to the wireless power reception device 200, the assigned ID is transmitted to the control unit 270, so that the power consumption device 251 can be identified (of course, the control unit 270 may be configured to identify the assigned ID in advance).

Meanwhile, the envelope/power detection unit 260 detects the power intensity of the wireless power signal received through the reception antenna unit 210, outputs the power intensity to the control unit 270, detects the envelope of the modulated ID data, and outputs the envelope to the control unit 270.

Further, the control unit 270 controls the entire operation of the wireless power reception device 200.

The control unit 270 controls the impedance of the reception antenna unit 210 depending on the power intensity of the wireless power signal, output from the envelope/power detection unit 260, and controls the impedance matching unit 230 to correct the matching between the impedance of the reception antenna unit 210 and the impedance of the power consumption device 251.

Further, the control unit 270 reads ID data using the envelope detected by the envelope/power detection unit 260, and extracts an ID included in the read ID data. When the extracted ID is found to be the ID of the power consumption device 251 connected to the wireless power reception device, the control unit 270 controls the switching of the switch unit 220 so that the power consumption device 251 is disconnected, thus preventing the reception antenna unit 210 from receiving a wireless power signal and allowing the reception antenna unit 210 to return the wireless power signal during the next period.

In this way, when the switch unit 220 is turned off under the control of the control unit 270, and then a wireless power signal, including the same ID data as that transmitted from the wireless power transmission device 100 in the next period, is returned to the wireless power transmission device 100, the wireless power transmission device 100 receives the returned wireless power signal, including the ID data, and checks the ID thereof, and is then able to verify that the wireless power reception device 200, to which the power consumption device 251 corresponding to the ID is connected, is in a reception enable state for wireless power and is a suitable wireless power reception device 200.

Figure 9:
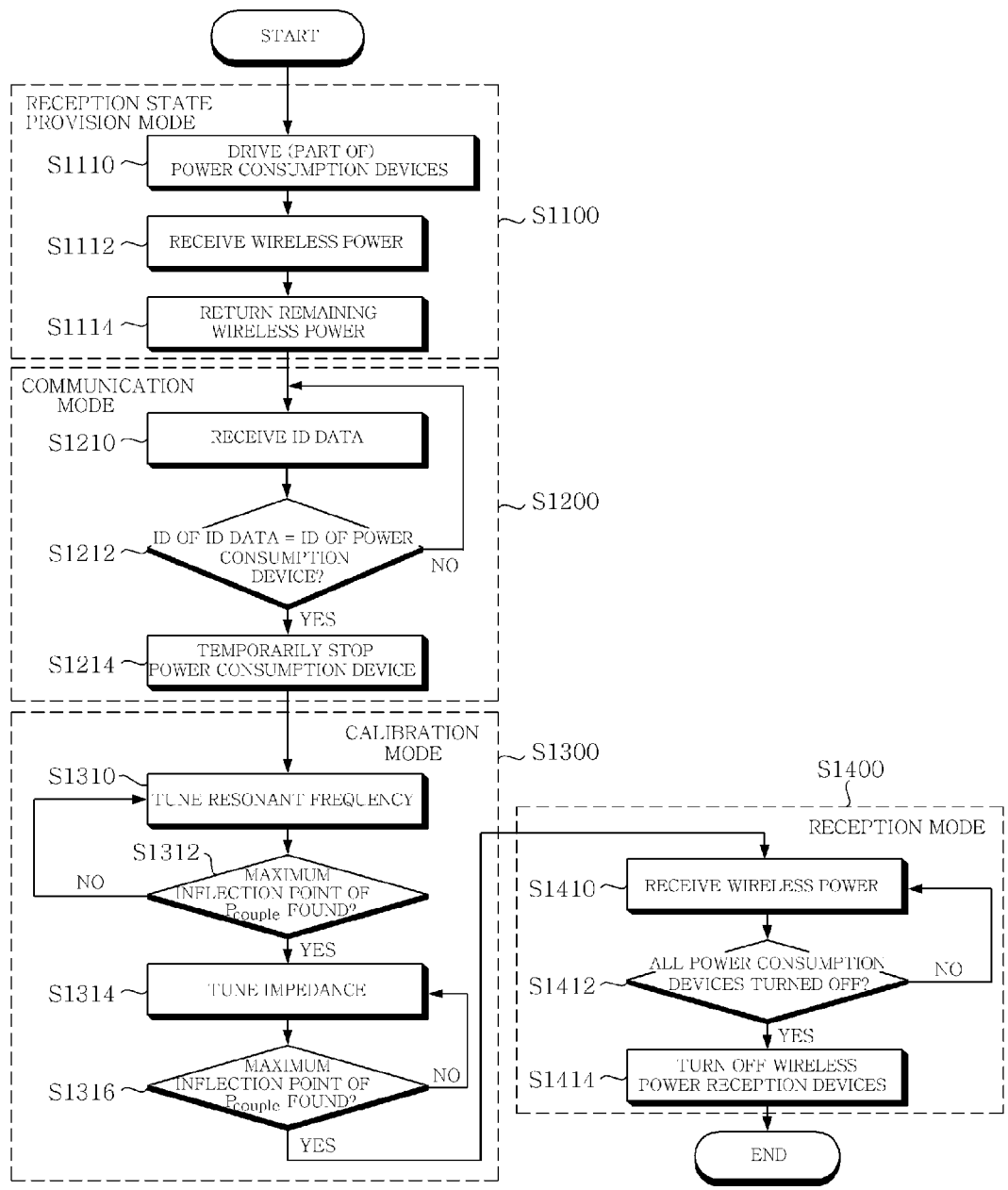
FIG. 9 is a flowchart showing a wireless power reception method using a wireless power reception device according to an embodiment of the present invention.

The operation of the wireless power reception device 200 having the above construction will be more clearly understood from the description of the flowchart of FIG. 9.

Figure 4:
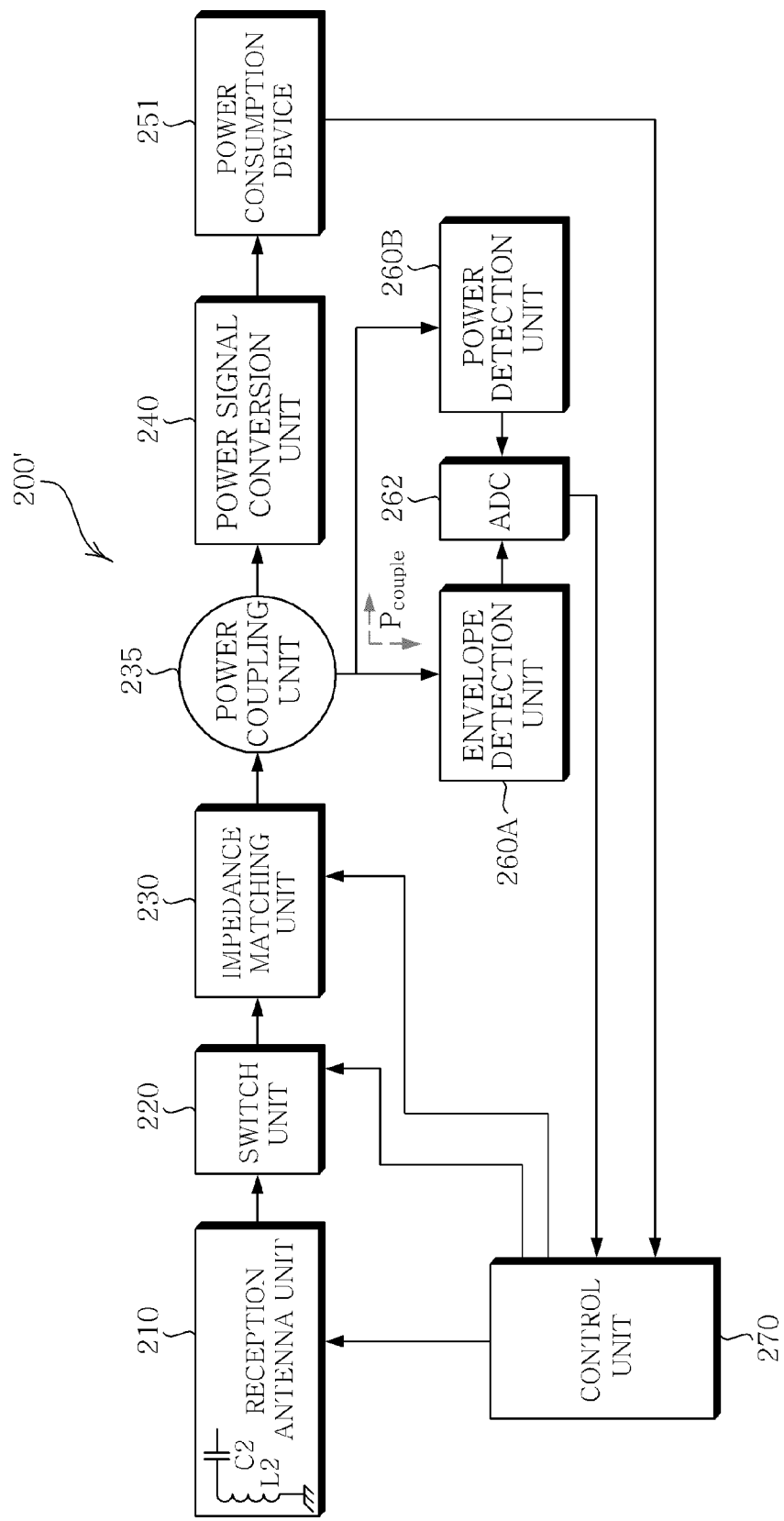
FIG. 4 is a block diagram showing a wireless power reception device according to another embodiment of the present invention.

FIG. 4 is a block diagram showing a wireless power reception device 200' according to another embodiment of the present invention.

As shown in FIG. 4, the wireless power reception device 200' according to another embodiment of the present invention is configured such that the envelope/power detection unit 260 of FIG. 3 is divided into an envelope detection unit 260A and a power detection unit 260B, unlike the wireless power reception device 200 of FIG. 3. Further, as will be described later with reference to FIG. 9, in communication mode, the power coupling unit 235 outputs a received wireless power signal, which is input from the reception antenna unit 210, both to the envelope detection unit 260A and to the power signal conversion unit 240. In power reception mode, the power coupling unit 235 outputs the received wireless power signal, which is input from the reception antenna unit 210, only to the power signal conversion unit 240.

When the power coupling unit 235 is used in the wireless power reception device 200 in this way, the envelope detection unit 260A and the power detection unit 260B can be separately configured, thus reducing power consumption. Further, the wireless power reception device 200' according to the present embodiment is different from the apparatus of FIG. 3 in that an Analog/Digital Converter (ADC) 262 for converting an analog signal into a digital signal is provided. The construction and operation of the remaining components are identical to those of FIG. 3, and thus a detailed description thereof is omitted.

FIG. 5 is a flowchart showing a wireless power transmission method using the wireless power transmission device 100 according to an embodiment of the present invention. Hereinafter, the wireless power transmission method according to the present embodiment will be described in detail with reference to FIG. 5.

As shown in FIG. 5, the wireless power transmission method using the wireless power transmission device 100 according to the embodiment of the present invention includes reception device (power consumption device) presence determination mode S100, calibration mode S200, communication mode S300, and power transmission mode S400.

First, in reception device presence determination mode S100, the control unit 170 generates a wireless power signal by driving the power signal generation unit 110 in order to determine whether a reception device is present in a standby state in which the power signal generation unit 110 is not being driven at step S112.

Further, the control unit 170 sets an initial resonant frequency, drives the transmission antenna unit 150 using the initial resonant frequency at step S114, and transmits the wireless power signal to a wireless power reception device 200 at step S116.

Thereafter, the transmission antenna unit 150 receives a returned wireless power signal which has been received from the wireless power reception device 200 at step S118. When the returned wireless power signal is output to the envelope/power detection unit 160 through the impedance matching unit 140 and the directional power coupling unit 130, the envelope/power detection unit 160 measures and outputs the power intensity of the returned wireless power signal.

Then, the control unit 170 determines whether the intensity $P_{reflect}$ of the returned wireless power signal is less than a first preset value (for example, this value may be 0.95 when the power transmitted from the wireless power transmission device 100 is assumed to be 1) at step S120.

In this case, if it is assumed that one or more power consumption devices of a plurality of wireless power reception devices 200 are turned on, the returned wireless power signal received by the wireless power transmission device 100 will be less than 0.95 because a predetermined amount of power is consumed when the power transmitted from the wireless power transmission device 100 is assumed to be 1.

If all of the power consumption devices of the wireless power reception devices 200 are turned off, it is determined that the returned wireless power signal received by the wireless power transmission device 100 will be greater than, for example, 0.95 even if loss is taken into consideration when the power transmitted from the wireless power transmission device 100 is assumed to be 1.

Therefore, the control unit 170 of the wireless power transmission device 100 determines whether the intensity of the returned wireless power signal detected by the envelope/power detection unit 160 is greater than the first preset value. If it is determined that the intensity of the returned wireless power signal is greater than the first preset value, the control unit 170 recognizes that all of the power consumption devices of the wireless power reception devices 200 are turned off, and is continuously maintained in a standby state.

If it is determined that the intensity of the returned wireless power signal is less than the first preset value, the control unit 170 recognizes that at least one of the power consumption devices of the wireless power reception devices 200 is turned on, and thus performs calibration mode S200 is executed.

Calibration mode S200 is a process for matching the resonant frequency of the transmission antenna unit 150 with the impedance of the impedance matching unit 140. First, while varying, that is, tuning the resonant frequency at step S210, the control unit 170 performs finding to determine whether a minimum inflection point is found in the received returned wireless power signal at step S212.

In this case, the fact that the minimum inflection point is found in the received returned wireless power signal means that the resonant frequency corresponding to the minimum inflection point is a resonant frequency suitable for maximum power transmission.

Therefore, the control unit 170 sets the resonant frequency to a resonant frequency corresponding to the minimum inflection point at step S214, and determines the number of power consumption devices (wireless power reception devices) corresponding to the set resonant frequency at step S216.

Figure 6A:
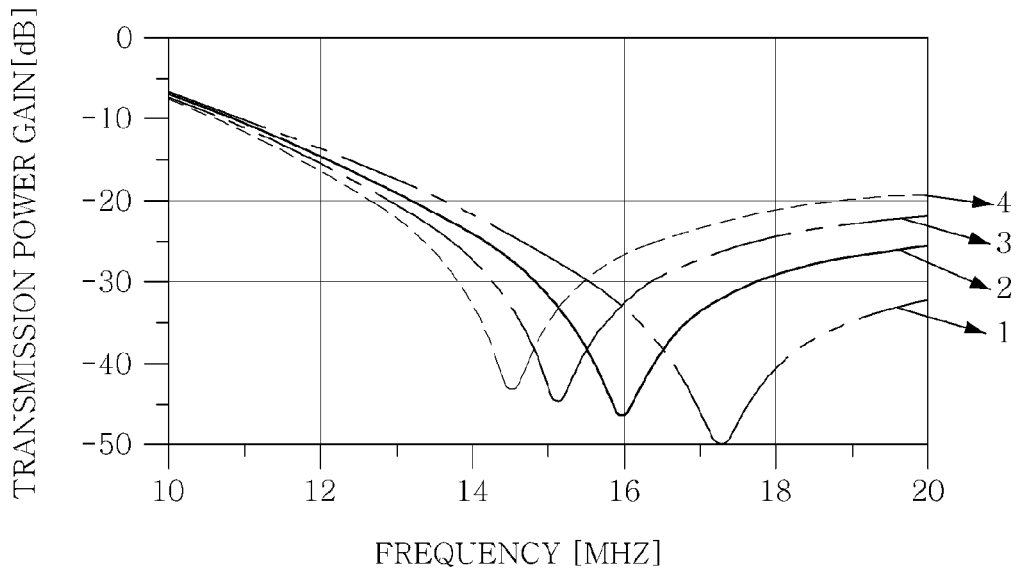
FIG. 6A is a graph showing variation in the gain of a returned wireless power signal and in resonant frequency, relative to the number of power consumption devices, in the wireless power reception device.
Figure 6B:
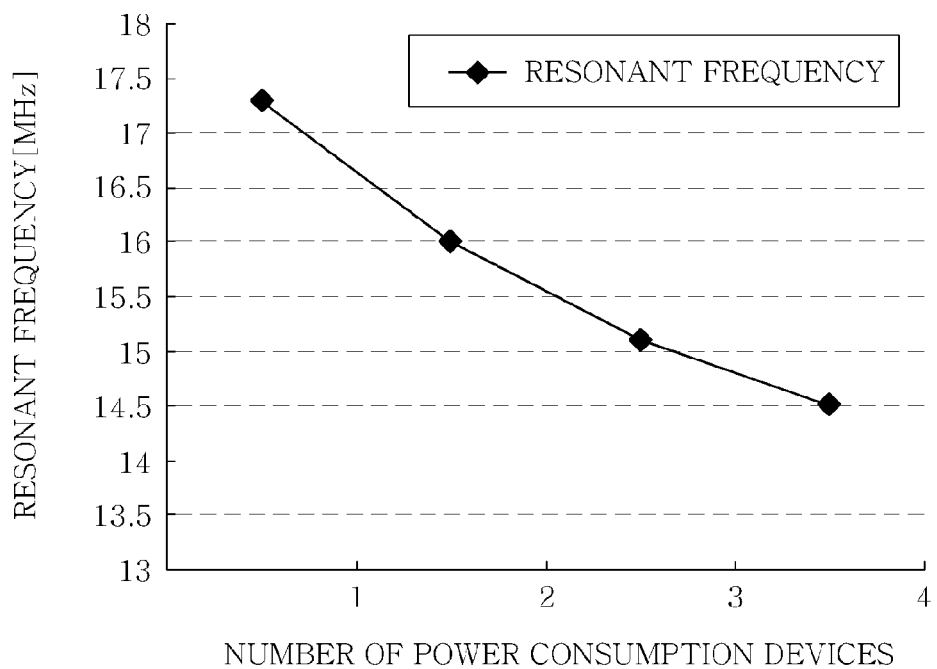
FIG. 6B is a graph showing variation in resonant frequency relative to the number of power consumption devices in the wireless power reception device.

The number of power consumption devices influences the resonant frequency of the returned wireless power signal. As shown in FIGS. 6A and 6B, the resonant frequency is characteristically weakened according to the increase in the number of power consumption devices.

FIG. 6A is a graph showing variation in the gain of the returned wireless power signal and in resonant frequency, relative to the number of power consumption devices, and FIG. 6B is a graph showing variation in resonant frequency relative to the number of power consumption devices. As shown in FIGS. 6A and 6B, it can be seen that, as the number of power consumption devices is large, the resonant frequency decreases, and transmission gain characteristics also decrease. Therefore, the number of power consumption devices can be determined using these characteristics.

Meanwhile, the control unit 170 determines the power intensity of a wireless power transmission signal according to the resonant frequency of the returned wireless power signal.

In this case, the power intensity may be determined such that it is doubled according to the number of power consumption devices.

In this case, when the power intensity of the power signal generation unit 110 increases, impedance matching between the power signal generation unit 110 and the transmission antenna unit 150 varies. Therefore, the control unit 170 performs impedance matching between the power signal generation unit 110 and the transmission antenna unit 150.

For this operation, the control unit 170 performs a finding procedure of finding the minimum inflection point of the returned wireless power signal at step S222 while tuning, that is, varying, the impedance of the impedance matching unit 140 at step S220.

As a result of the finding procedure, when the minimum inflection point is found, communication mode 5300 is executed to determine whether found power consumption devices are suitable power consumption devices before wireless power is transmitted at a relevant power intensity.

In communication mode 5300, the control unit 170 sequentially generates and outputs pieces of ID data, each including the ID of a corresponding power consumption device desired to be detected, by controlling the OOK modulator 120 so as to determine whether wireless power reception devices 200 in a reception state are suitable wireless power reception devices 200 at step S310. That is, when the number of wireless power reception devices 200 is plural, pieces of ID data, each including the ID of a power consumption device connected to a corresponding wireless power reception device, are sequentially generated and are repeatedly output at least twice.

Further, the control unit 170 transmits the wireless power signal, including the modulated ID data, output from the OOK modulator 120, to the wireless power reception devices (200-1, 200-2 and 200-3 of FIG. 1).

In this case, when ID data, including an ID assigned to a power consumption device connected to a relevant wireless power reception device 200, is received, the relevant wireless power reception device 200 performs an OFF operation for about one period by turning off the switch unit 220 under the control of the control unit 270. Accordingly, the wireless power reception device 200 does not receive a wireless power signal including ID data, and returns the wireless power signal to the wireless power transmission device 100 during one period in which the switch unit 220 is turned off.

Figure 7:
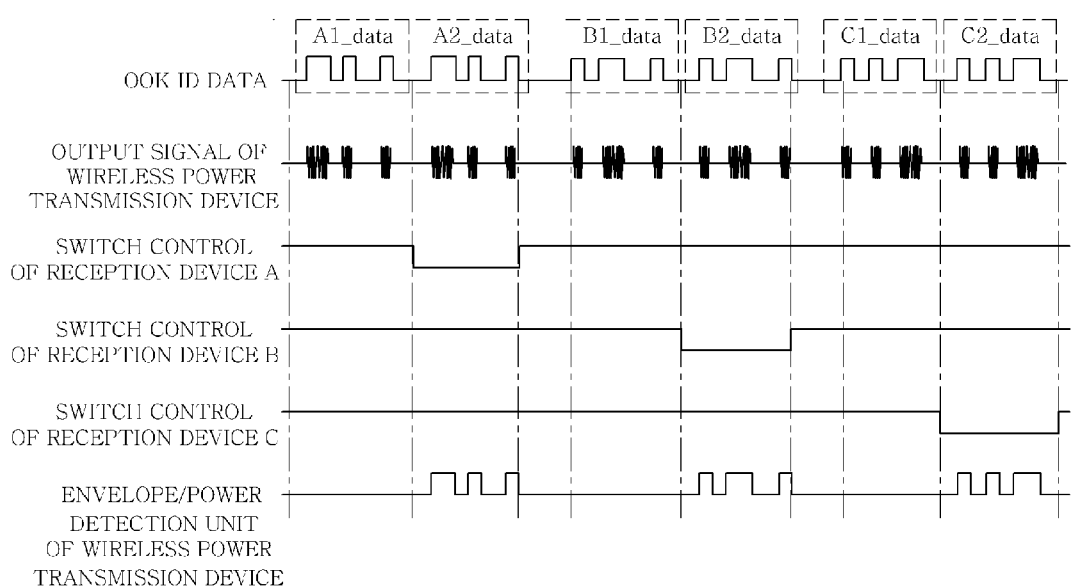
FIG. 7 is a diagram showing a switching operation used in the wireless power transmission/reception apparatus and method according to the present invention.

Referring to FIG. 7, this procedure is described in detail. It is assumed that power consumption devices A(251-1) to C(251-3) are present (refer to FIG. 1), OOK modulated ID data A_data is assigned to the power consumption device A(251-1), OOK modulated ID data B_data is assigned to the power consumption device B(251-2), and OOK modulated ID data C_data is assigned to the power consumption device C(251-3). In this case, when the first OOK modulated ID data is received in the state in which each of the wireless power reception devices 200 connected to corresponding power consumption devices is turned on, the relevant wireless power reception device 200 performs an OFF operation for the next period, thus returning a wireless power signal, including the relevant OOK modulated ID data, to the wireless power transmission device 100.

In this way, when the ID data is returned from the wireless power reception device 200, the control unit 170 of the wireless power transmission device 100 determines whether the returned ID data is identical to the transmitted ID data at step S312, and repeats a process for transmitting and checking subsequent ID data if it is determined that the returned ID data is not identical to the transmitted ID data.

Further, if it is determined that the returned ID data is identical to the transmitted ID data, the control unit 170 performs such a finding operation on all target power consumption devices, and thereafter determines whether the finding operation on all target power consumption devices has been terminated at step S314.

When finding has been performed and then terminated on all target power consumption devices in this way, the control unit determines whether the number of suitable wireless power reception devices 200, which is detected by transmitting the ID data, is identical to the number of wireless power reception devices 200, which is detected by obtaining the minimum inflection point while tuning the resonant frequency (in calibration mode), at step S316.

If it is determined that the numbers are identical to each other, the control unit 170 executes power transmission mode S400, whereas if it is determined that the numbers are not identical to each other, the control unit 170 tunes the resonant frequency again to a resonant frequency corresponding to the detected number of suitable wireless power reception devices 200 at step S318. The resonant frequency is tuned again to the resonant frequency corresponding to the number of wireless power reception devices, the transmitted ID data and the returned ID data of which are identical. Accordingly, the control unit performs control such that resonance is concentrated only on the wireless power reception devices, the transmitted ID data and the returned ID data of which are identical. As a result, the transmission of wireless power to wireless power reception devices, which are turned on, but do not have identical ID data, is minimized. Accordingly, the consumption of power that is unnecessarily transmitted in a wireless manner can be minimized.

Further, the control unit 170 tunes the impedance of the impedance matching unit 140 at step S320. After the number of wireless power reception devices, the transmitted ID data and the returned ID data of which are identical, is detected, the wireless power transmission device 100 transmits wireless power of an appropriate intensity. The reason for this is that the impedance between the transmission antenna unit 150 and the power amplification unit 112 of the wireless power transmission device needs to be adjusted according to the transmission of wireless power. The impedance is readjusted, and thus power loss can be minimized. After the tuning of the impedance has been performed, power transmission is performed.

In power transmission mode 5400, the control unit 170 transmits wireless power in the state in which the OOK modulator 120 is turned on at step S410. Such wireless power is input through the first port of the directional power coupling unit 130 and is output only through the second port, and is then transferred to the transmission antenna unit 150.

Further, the control unit 170 periodically monitors variation in the intensity of a returned wireless power signal at step S412, and determines whether the intensity variation is greater than a second preset value at step S414. Here, the second preset value refers to the amount of power received when any one of the power consumption devices is turned off, and is a percentage value of the wireless power transmission signal. For example, when it is assumed that the number of suitable wireless power reception devices is determined to be three, and then a transmission signal is transmitted as a value of 3, the second preset value may be 0.9 which does not reach 33% of the transmission signal. When one power consumption device is turned off, the returned wireless power signal is about 1. When two power consumption devices are turned off, the returned wireless power signal is about 2. Further, when three power consumption devices are turned off, the returned wireless power signal is about 3. Therefore, when the returned wireless power signal is greater than 0.95, it can be seen that any one of the power consumption devices is turned off.

If it is determined that the variation in the intensity of the returned wireless power signal is greater than the second preset value, the control unit recognizes that at least one of the power consumption devices is turned off, and determines whether all power consumption devices are turned off.

Such determination is performed by determining whether the returned wireless power signal is greater than a third preset value at step S416. Here, the third preset value refers to a value required to determine that the amount of received wireless power is weak when the power consumption devices are disconnected or when charging by the battery charger is completed, and is a percentage value of the wireless power transmission signal. For example, the number of wireless power reception devices is determined to be three, and transmission power is transmitted as a value of 3, the third preset value is 2.1, which reaches 70% of 3. When one power consumption device is turned off, the returned wireless power signal is 1. When two power consumption devices are turned off, the returned wireless power signal is 2. When three power consumption devices are turned off, the returned wireless power signal is 3. Therefore, when the returned wireless power signal is greater than 2.1, it can be seen that all power consumption devices have been turned off.

It should be noted that the second preset value and the third preset value are not absolute values, and vary depending on the intensity of a wireless power transmission signal and the number of wireless power reception devices determined to be suitable.

Meanwhile, if it determined that the returned wireless power signal is not greater than the third preset value, it means that any one of the power consumption devices is disconnected, but one or more of the power consumption devices are still connected. Therefore, the control unit 170 repeats a procedure starting from calibration mode S200 (of course, since the power consumption devices are determined to be suitable devices at that time, communication mode may be omitted).

In contrast, if it is determined that the returned wireless power signal is greater than the third preset value, the control unit determines that all power consumption devices are disconnected, and then stops wireless power transmission at step S418.

Figure 8:
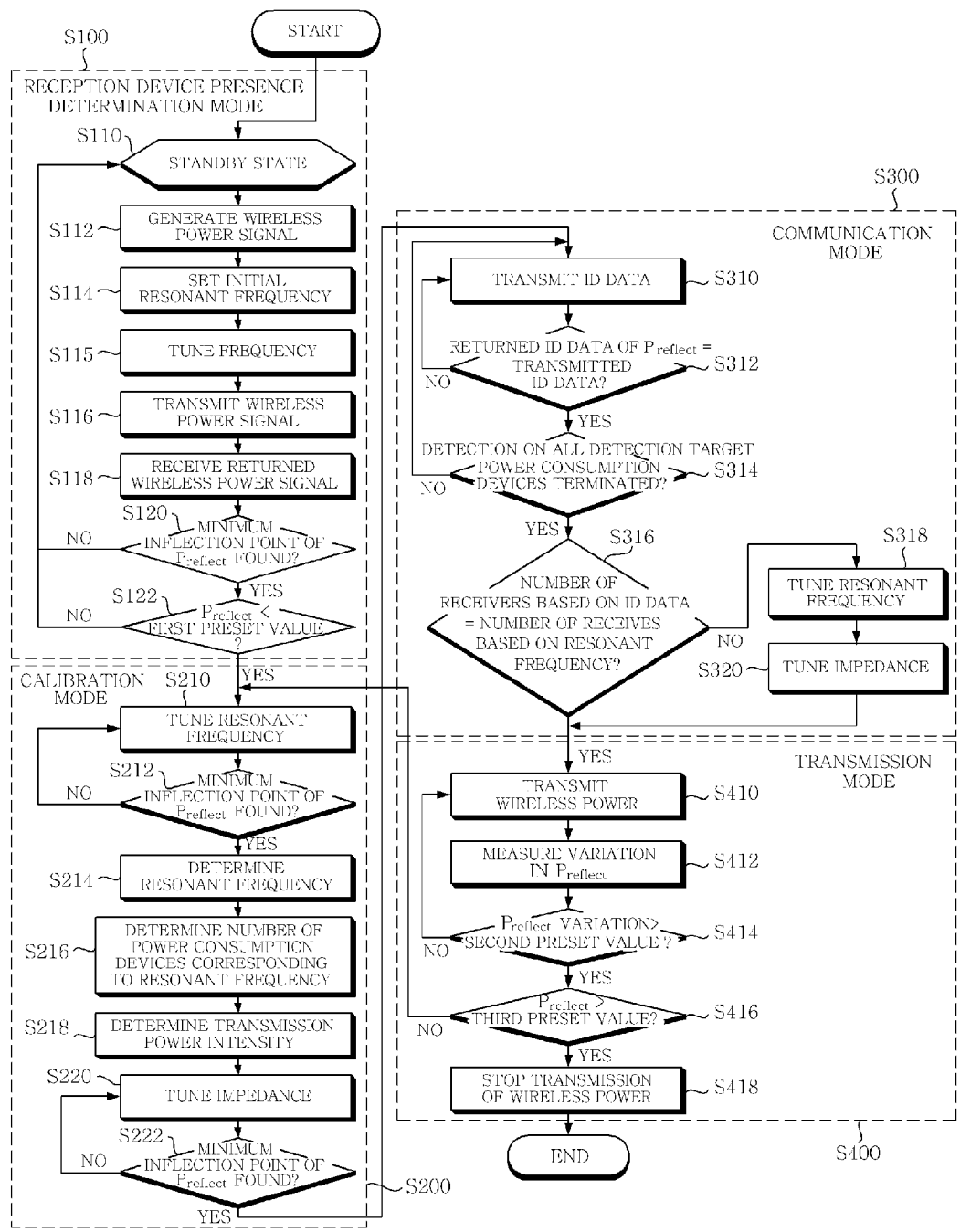
FIG. 8 is a flowchart showing a wireless power transmission method using a wireless power transmission device according to another embodiment of the present invention.

FIG. 8 is a flowchart showing a wireless power transmission method using the wireless power transmission device 100 according to another embodiment of the present invention. The wireless power transmission method of FIG. 8 using the wireless power transmission device according to the present embodiment is configured such that a frequency tuning procedure S115 is further included in the reception device presence determination mode S100 in the wireless power transmission method of FIG. 5 using the wireless power transmission device according to one embodiment of the present invention, in order to improve the precision when determining the presence of reception devices.

For this configuration, as shown in FIG. 8, an initial resonant frequency is set, and thereafter a wireless power signal is transmitted at step S116 while the initial resonant frequency is tuned, that is, varied at step S115. Further, a returned wireless power signal is received at step S118, and whether a minimum inflection point is present in the power intensity of the returned wireless power signal is determined at step S120. If it is determined that a minimum inflection point is found, the power intensity of the returned wireless power signal at the resonant frequency corresponding to the found minimum inflection point is compared with a first preset value at step S122. When the resonant frequency is tuned in the reception device presence determination mode S100 in this way, precision can be improved when the presence of reception devices is determined. The remaining operations of the flowchart of FIG. 8 are similar to those of FIG. 5, and thus a detailed description thereof is omitted.

FIG. 9 is a flowchart showing a wireless power reception method using the wireless power reception device according to an embodiment of the present invention.

Referring to FIG. 9, the wireless power reception method using the wireless power reception device 200 according to the present invention includes reception state provision mode S1100, communication mode S1200, calibration mode S1300, and power reception mode 1400.

First, in the reception state provision mode S1100, a relevant wireless power reception device 200 provides information about a reception state indicating whether a power consumption device is currently being connected to the wireless power reception device 200 to receive wireless power.

The provision of information about the reception state of the power consumption device is initiated in such a way that, when part or all of power consumption devices are driven at step S1110, the control unit 270 of a relevant wireless power reception device 200 enables the reception antenna unit 210 to receive wireless power transmitted from the wireless power transmission device 100 by turning on the switch unit 220.

In this case, the driving of the power consumption devices 251 is performed by the manipulation of a user when the power consumption device is the television 251-1 or the notebook computer 251-2. However, when the power consumption device is the battery charger 251-3, the control unit 270 automatically turns on a relevant switch unit according to the capacity of a battery detected by a battery capacity detector (not shown), thus driving the battery charger 251-3.

Meanwhile, the wireless power signal received by the reception antenna unit 210 at step S1112 is provided to the power consumption device 251, connected to the wireless power reception device, through the switch unit 220, the impedance matching unit 230 and the power signal conversion unit 240, and the remaining wireless power signal which is not received by the reception antenna unit 210 is returned to the wireless power transmission device at step S1114.

Then, the wireless power transmission device 100 measures the power intensity of the returned wireless power signal, and then determines whether wireless power reception devices 200 desiring to receive the wireless power are connected (this determination procedure was described above).

When the wireless power reception device 200 provides information about the state of connection to the wireless power transmission device 100 in reception state provision mode in this way, the wireless power transmission device 100 executes communication mode (which was described above).

Accordingly, the wireless power reception device 200 also executes communication mode S1210, thus notifying the wireless power transmission device 100 that the currently connected power consumption device is a suitable power consumption device.

For this operation, the control unit 270 receives ID data transmitted from the wireless power transmission device 100 at step S1210 (the reception path of the ID data follows the sequence of reception antenna 210—switch unit 220—envelope/power detection unit 260).

Next, the ID included in the received ID data is extracted, so that whether the ID is identical to the ID of the power consumption device connected to the wireless power reception device is determined at step S1212. If it is determined that the ID is not identical to the ID of the power consumption device, other pieces of ID data are continuously received, and the ID included in the ID data is compared with the ID of the power consumption device.

If it is determined that the ID of the received ID data is identical to the ID of the power consumption device, the power consumption device 251 is temporarily stopped at step S1214. In this case, the control unit 270 uses the switch unit 220 to temporarily stop the operation of the power consumption device 251 corresponding to the ID included in the received ID data. As described above, the wireless power transmission device 100 successively transmits two pieces of ID data. The temporarily stopped power consumption device 251 cannot receive second piece of ID data, and thus returns the ID data to the wireless power transmission device 100.

Next, in calibration mode S1300, the control unit 270 finds the maximum inflection point of the received wireless power signal $P_{couple}$ at step S1312 while tuning, that is, varying, the resonant frequency of the reception antenna unit 210 at step S1310.

As a result of the finding, when the maximum inflection point is found (this means that a location at which the reception of maximum power occurs is found), the control unit 270 finds the maximum infection point of the received wireless power transmission signal $P_{couple}$ at step S1316 while tuning, that is, varying, the impedance of the impedance matching unit 230 at step S1314, in order to subsequently provide impedance matching of the impedance matching unit 230.

As a result of the finding, when the maximum inflection point of the received wireless power transmission signal has been found, the control unit terminates calibration mode S1300 at step S1300, and executes power reception mode S1400.

Power reception mode S1400 is initiated in such a way that the wireless power reception device 200 receives the wireless power transmission signal and provides power to the connected power consumption device.

Further, the control unit 270 determines whether the power consumption device is turned off while the wireless power signal is received at step S1412, and is maintained in a power reception state if it is determined that the power consumption device is not turned off. Further, if it is determined that the power consumption device is turned off, the control unit turns off the switch unit 220 of the wireless power reception device, thus turning off the wireless power reception device 200.

In such power reception mode S1400, when the power consumption device 251 is a television or a notebook computer, the connection thereof is released by the manipulation of a user. However, when the power consumption device is a battery charger, the control unit 270 may automatically turn off the switch unit 220 according to the capacity of a battery detected by a battery capacity detector (not shown), thus enabling the connection of the battery charger to be released.

As described above, a wireless power transmission/reception apparatus according to the present invention can perform both communication and power transmission without requiring separate transceivers, thus reducing the cost of the wireless power transmission/reception apparatus, and simplifying the construction and control of the apparatus.

Further, a wireless power transmission device according to the present invention performs simplex communication, but actively recognizes a response from reception devices, thus realizing the effect of duplex communication.

Furthermore, a wireless power reception device according to the present invention has an effectively controlled construction, thus preventing the unnecessary consumption of transmission power, and maintaining the security of a wireless power transmission device by periodically varying the resonant frequency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, it should be noted that such modifications or changes belong to the claims of the present invention.

What is claimed is:

1. A wireless power transmission/reception apparatus having a communication function, comprising:

a wireless power transmission device for receiving externally input power, generating a wireless power signal to be transmitted in a wireless manner, transmitting the wireless power signal in a wireless manner using a magnetic resonance method, receiving a returned wireless power signal, detecting a number of power consumption devices, transmitting the wireless power signal in a wireless manner using a resonant frequency corresponding to the detected number of power consumption devices, modulating pieces of identification (ID) data, each including an ID of a corresponding power consumption device, by using the wireless power signal as a carrier, transmitting the modulated ID data, receiving returned ID data, determining suitableness of the power consumption device, and transmitting the wireless power signal to the power consumption device; and a plurality of wireless power reception devices for receiving the wireless power signal transmitted from the wireless power transmission device using a magnetic resonance method, providing the wireless power signal to a power consumption device connected thereto, returning a remaining wireless power signal that has not been received, receiving ID data from the wireless power transmission device, and temporarily stopping the connected power consumption device and returning ID data, which will be subsequently received, to the wireless power transmission device when each ID included in the received ID data is an ID of the connected power consumption device.

2. The wireless power transmission/reception apparatus as set forth in claim 1, wherein the wireless power transmission device comprises:

a power signal generation unit for receiving the externally input power and generating and outputting the wireless power signal;

an On/Off Keying (OOK) modulator for transferring the wireless power signal output from the power signal generation unit, receiving the ID data including the ID of the power consumption device, OOK modulating the ID data by using the wireless power signal output from the power signal generation unit as the carrier, and outputting the modulated ID data;

a transmission antenna unit configured to include an inductor and a capacitor and to transmit both the wireless power signal and the modulated ID data using the resonant frequency determined by the inductor and the capacitor through the magnetic resonance method, and to receive and output the returned wireless power signal and the returned ID data which are received from the wireless power reception devices;

a directional power coupling unit for outputting the wireless power signal, input through a first port, to the transmission antenna unit through a second port, outputting the modulated ID data, input through the first port, to the transmission antenna unit through the second port, and outputting the returned wireless power signal and the returned ID data, input from the transmission antenna unit through the second port, through a third port;

an envelope/power detection unit for detecting and outputting a power intensity of the returned wireless power signal output through the third port, and detecting and outputting an envelope of the returned ID data; and a control unit for detecting a number of power consumption devices corresponding to the power intensity of the returned wireless power signal detected by the envelope/power detection unit, controlling the transmission antenna unit so that the wireless power signal is transmitted using the resonant frequency corresponding to the detected number of power consumption devices, providing the ID data including the ID of a corresponding power consumption device to the OOK modulator, controlling the OOK modulator such that the ID data including the ID of the power consumption device is OOK modulated by using the wireless power signal as the carrier and the modulated ID data is transmitted, detecting the returned ID data using the envelope detected by the envelope/power detection unit, determining suitableness of the power consumption device based on the detected returned ID data, and controlling the transmission antenna unit so that power is provided to the power consumption device.

3. The wireless power transmission/reception apparatus as set forth in claim 2, wherein the wireless power transmission device further comprises an impedance matching unit disposed between the power signal generation unit and the transmission antenna unit and configured to perform impedance matching between the power signal generation unit and the transmission antenna unit.

4. The wireless power transmission/reception apparatus as set forth in claim 3, wherein the control unit finds a minimum inflection point of the returned wireless power signal received from the envelope/power detection unit while varying impedance of the impedance matching unit, and sets the impedance of the impedance matching unit to impedance corresponding to the detected minimum inflection point.

5. The wireless power transmission/reception apparatus as set forth in claim 2, wherein the control unit finds a minimum inflection point of the returned wireless power signal received from the envelope/power detection unit and sets the resonant frequency of the transmission antenna unit to a resonant frequency corresponding to the detected minimum inflection point.

6. The wireless power transmission/reception apparatus as set forth in claim 2, wherein the power signal generation unit comprises:
a signal oscillation unit for receiving the external power and generating the wireless power signal desired to be transmitted; and
a power amplification unit for amplifying and outputting the wireless power signal generated by the signal oscillation unit.

7. The wireless power transmission/reception apparatus as set forth in claim 1, wherein each of the wireless power reception devices comprises:
a reception antenna unit configured to include an inductor and a capacitor and to receive the signal and the data transmitted from the wireless power transmission device, that is, both the wireless power signal and the ID data, modulated by using the wireless power signal as the carrier, using a resonant frequency determined by the inductor and the capacitor through the magnetic resonance method, and to return the remaining wireless power signal and the modulated ID data to the wireless power transmission device;

a power signal conversion unit connected to a corresponding power consumption device and configured to convert the wireless power signal received by the reception antenna unit into a power signal based on a power supply method, and provide the power signal to the power consumption device;

an envelope/power detection unit for detecting a power intensity of the wireless power signal received by the reception antenna unit, outputting the power intensity, detecting an envelope from the ID data received by the reception antenna unit, and outputting the envelope; and a control unit for performing control such that the reception antenna unit receives both the wireless power signal and the ID data, extracting the ID data using the envelope detected by the envelope/power detection unit, and performing control such that, when an ID included in the extracted ID data is an ID of the power consumption device, the corresponding power consumption device is temporarily stopped and ID data, which will be subsequently received, is returned to the wireless power transmission device.

8. The wireless power transmission/reception apparatus as set forth in claim 7, wherein the control unit finds a maximum inflection point of the power intensity detected by the envelope/power detection unit while tuning the resonant frequency of the reception antenna unit, and sets the resonant frequency of the reception antenna unit to a resonant frequency corresponding to the detected maximum inflection point.

9. The wireless power transmission/reception apparatus as set forth in claim 7, wherein:
the wireless power reception device further comprises an impedance matching unit disposed between the reception antenna unit and the power signal conversion unit; and
the control unit finds a maximum inflection point of the power intensity detected by the envelope/power detection unit while tuning impedance of the impedance matching unit, and sets the impedance of the impedance matching unit to impedance corresponding to the detected maximum inflection point.

10. The wireless power transmission/reception apparatus as set forth in claim 7, wherein:
the wireless power reception device further comprises a switch unit disposed between the reception antenna unit and the power signal conversion unit and configured to interrupt transmission of power received by the reception antenna unit; and
the control unit interrupts transmission of the power, received by the reception antenna unit, by controlling the switch unit when connection of the power consumption device is released.

11. A wireless power transmission device having a communication function, comprising:
a power signal generation unit for receiving externally input power and generating and outputting a wireless power signal;
an On/Off Keying (OOK) modulator for transferring the wireless power signal output from the power signal generation unit, receiving pieces of identification (ID) data, each including an ID of a corresponding power consumption device, OOK modulating the ID data by using the wireless power signal as a carrier, and outputting the modulated ID data;
a transmission antenna unit configured to include an inductor and a capacitor and to transmit both the wireless power signal and the modulated ID data using a resonant frequency determined by an inductor and a capacitor through a magnetic resonance method, and to receive and output a returned wireless power signal and returned ID data which are received from wireless power reception devices;
a directional power coupling unit for outputting the wireless power signal, input through a first port, to the transmission antenna unit through a second port, outputting the modulated ID data, input through the first port, to the transmission antenna unit through the second port, and outputting the returned wireless power signal and the returned ID data, input from the transmission antenna unit through the second port, through a third port;
an envelope/power detection unit for detecting and outputting a power intensity of the returned wireless power signal output through the third port, and detecting and outputting an envelope of the returned ID data; and
a control unit for detecting a number of power consumption devices corresponding to the power intensity of the returned wireless power signal detected by the envelope/power detection unit, controlling the transmission antenna unit so that the wireless power signal is transmitted using the resonant frequency corresponding to the detected number of power consumption devices, providing the ID data including the ID of a corresponding power consumption device to the OOK modulator, controlling the OOK modulator such that the ID data including the ID of the power consumption device is OOK modulated by using the wireless power signal as the carrier and the modulated ID data is transmitted, detecting the returned ID data using the envelope detected by the envelope/power detection unit, determining suitableness of the power consumption device based on the detected returned ID data, and controlling the transmission antenna unit so that power is provided to the power consumption device.

12. The wireless power transmission device as set forth in claim 11, further comprising an impedance matching unit disposed between the power signal generation unit and the transmission antenna unit and configured to perform impedance matching between the power signal generation unit and the transmission antenna unit.

13. The wireless power transmission device as set forth in claim 12, wherein the control unit finds a minimum inflection point of the returned wireless power signal received from the envelope/power detection unit while varying impedance of the impedance matching unit, and sets the impedance of the impedance matching unit to impedance corresponding to the detected minimum inflection point.

14. The wireless power transmission device as set forth in claim 11, wherein the control unit finds a minimum inflection point of the returned wireless power signal received from the envelope/power detection unit and sets the resonant frequency of the transmission antenna unit to a resonant frequency corresponding to the detected minimum inflection point.

15. A wireless power reception device having a communication function, comprising:
a reception antenna unit configured to include an inductor and a capacitor and to receive a signal and data transmitted from a wireless power transmission device, that is, both a wireless power signal and identification (ID) data, modulated by using the wireless power signal as a carrier, using a resonant frequency determined by the inductor and the capacitor through a magnetic resonance method, and to return a remaining wireless power signal and the modulated ID data to the wireless power transmission device;
a power signal conversion unit connected to a corresponding power consumption device and configured to convert the wireless power signal received by the reception antenna unit into a power signal based on a power supply method, and provide the power signal to the power consumption device;
an envelope/power detection unit for detecting a power intensity of the wireless power signal received by the reception antenna unit, outputting the power intensity, detecting an envelope from the ID data received by the reception antenna unit, and outputting the envelope; and
a control unit for performing control such that the reception antenna unit receives both the wireless power signal and the ID data, extracting the ID data using the envelope detected by the envelope/power detection unit, and performing control such that, when an ID included in the extracted ID data is an ID of the power consumption device, the corresponding power consumption device is temporarily stopped and ID data, which will be subsequently received, is returned to the wireless power transmission device.

16. The wireless power reception device as set forth in claim 15, wherein the control unit finds a maximum inflection point of the power intensity detected by the envelope/power detection unit while tuning the resonant frequency of the reception antenna unit, and sets the resonant frequency of the reception antenna unit to a resonant frequency corresponding to the detected maximum inflection point.

17. The wireless power reception device as set forth in claim 15, further comprising an impedance matching unit disposed between the reception antenna unit and the power signal conversion unit,
wherein the control unit finds a maximum inflection point of the power intensity detected by the envelope/power detection unit while tuning impedance of the impedance matching unit, and sets the impedance of the impedance matching unit to impedance corresponding to the detected maximum inflection point.

18. The wireless power reception device as set forth in claim 15, further comprising a switch unit disposed between the reception antenna unit and the power signal conversion unit and configured to interrupt transmission of power received by the reception antenna unit,
wherein the control unit interrupts transmission of the power, received by the reception antenna unit, by controlling the switch unit when connection of the power consumption device is released.

19. The wireless power reception device as set forth in claim 15, wherein:
the envelope/power detection unit comprises an envelope detection unit and a power detection unit;
the wireless power reception device further comprises a power coupling unit disposed between the reception antenna unit and the power signal conversion unit; and
the wireless power signal is output both to the envelope detection unit and to the power detection unit.

20. A wireless power transmission/reception method having a communication function, comprising:
(A) a wireless power transmission device transmitting a wireless power signal to a plurality of wireless power reception devices using a magnetic resonance method, receiving a remaining wireless power signal which is returned among wireless power signals provided to power consumption devices respectively connected to the wireless power reception devices, from the wireless power reception devices, and determining whether the power consumption devices are connected;

(B) if it is determined that the power consumption devices are connected, the wireless power transmission device finding a resonant frequency enabling transmission of maximum power, detecting a number of power consumption devices, and transmitting the wireless power signal at a power intensity corresponding to the detected number of power consumption devices;

(C) the wireless power transmission device modulating pieces of identification (ID) data, each including an ID assigned to a corresponding power consumption device, by using the wireless power signal as a carrier through On/Off keying (OOK) modulation, and sequentially and repeatedly transmitting the modulated ID data at least twice;

(D) each of the plurality of wireless power reception devices receiving the ID data, detecting an ID from the ID data, and temporarily stopping a power consumption device connected thereto and returning ID data, which will subsequently reach the wireless power reception device, when the detected ID is an ID of the connected power consumption device; and (E) the wireless power transmission device receiving the returned ID data, determining that the connected power consumption device is suitable when the returned ID data is identical to the transmitted ID data, and then continuing to transmit power.

21. The wireless power transmission/reception method as set forth in claim 20, wherein (A) comprises:
   (A-1) the wireless power transmission device transmitting the wireless power signal to the wireless power reception devices using the magnetic resonance method;
   (A-2) each of the wireless power reception devices receiving the wireless power signal to be provided to a power consumption device connected thereto, and returning the to remaining wireless power signal; and
   (A-3) the wireless power transmission device receiving the returned wireless power signal, detecting a power intensity of the returned wireless power signal, and then determining whether the power consumption devices are connected.

22. The wireless power transmission/reception method as set forth in claim 20, wherein (B) comprises:
   (B-1) if it is determined that the power consumption devices are connected, the wireless power transmission device finding a minimum inflection point of the returned wireless power signal while varying a resonant frequency; and
   (B-2) the wireless power transmission device determining that a resonant frequency corresponding to the found minimum inflection point is a resonant frequency enabling transmission of maximum power, detecting a number of power consumption devices using the determined resonant frequency, and transmitting the wireless power signal at a power intensity corresponding to the detected number of power consumption devices.

23. A wireless power transmission method having a communication function, comprising:
   (A) a wireless power transmission device transmitting a wireless power signal to wireless power reception devices using a magnetic resonance method;
   (B) the wireless power transmission device receiving a returned wireless power signal which is received from the wireless power reception devices, detecting a power intensity of the returned wireless power signal, and determining whether the power consumption devices are connected;
   (C) if it is determined that the power consumption devices are connected, the wireless power transmission device finding a resonant frequency enabling transmission of maximum power, detecting a number of power consumption devices, and transmitting the wireless power signal at the power intensity corresponding to the detected number of power consumption devices;
   (D) the wireless power transmission device modulating pieces of identification (ID) data, each including an ID assigned to a corresponding power consumption device, using the wireless power signal as a carrier through On/Off Keying (OOK) modulation, and sequentially and repeatedly transmitting the modulated ID data at least twice; and
   (E) the wireless power transmission device receiving returned ID data from the wireless power reception devices, determining that the connected power consumption devices are suitable when the returned ID data is identical to the transmitted ID data, and continuing to transmit wireless power.

24. The wireless power transmission method as set forth in claim 23, wherein (C) comprises:
   (C-1) if it is determined that the power consumption devices are connected, the wireless power transmission device finding a minimum inflection point of the returned wireless power signal while varying the resonant frequency; and
   (C-2) the wireless power transmission device determining that the resonant frequency corresponding to the found minimum inflection point is a resonant frequency enabling transmission of maximum power, detecting the number of power consumption devices using the determined resonant frequency, and transmitting the wireless power signal at a power intensity corresponding to the detected number of power consumption devices.

25. A wireless power reception method having a communication function, comprising:
   (A) when a wireless power signal is transmitted from a wireless power transmission device, wireless power reception devices receiving wireless power signals to be provided to power consumption devices connected thereto from the wireless power transmission device, and returning a remaining wireless power signal;
   (B) each of the wireless power reception devices receiving ID data transmitted from the wireless power transmission device, detecting an ID from the ID data, and temporarily stopping a power consumption device connected thereto and returning ID data, which will subsequently reach the wireless power reception device when the detected ID is an ID of the connected power consumption device; and
   (C) when connection of the power consumption device to the wireless power reception device is released, the wireless power reception device stopping reception of the wireless power signal transmitted from the wireless power transmission device.

* * * * *